Dec. 23, 1947.  R. S. COLLEY  2,433,092
VALVE
Filed March 6, 1944
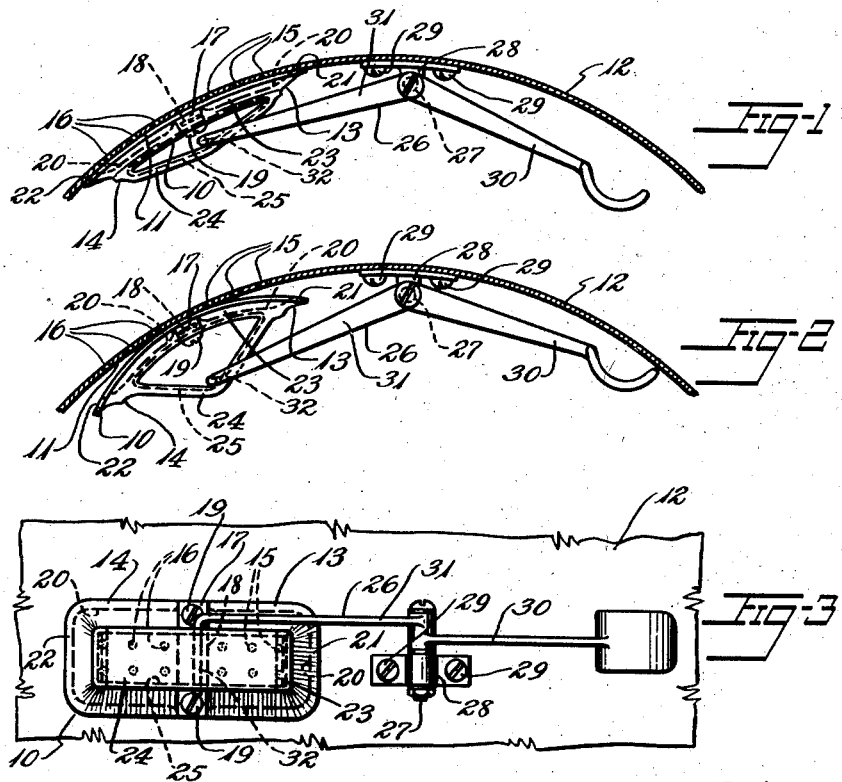
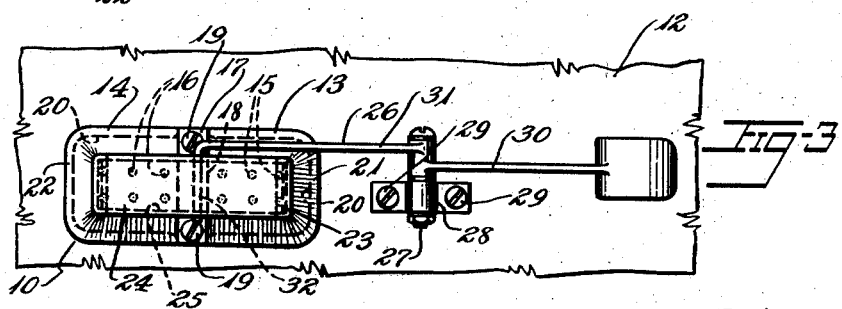
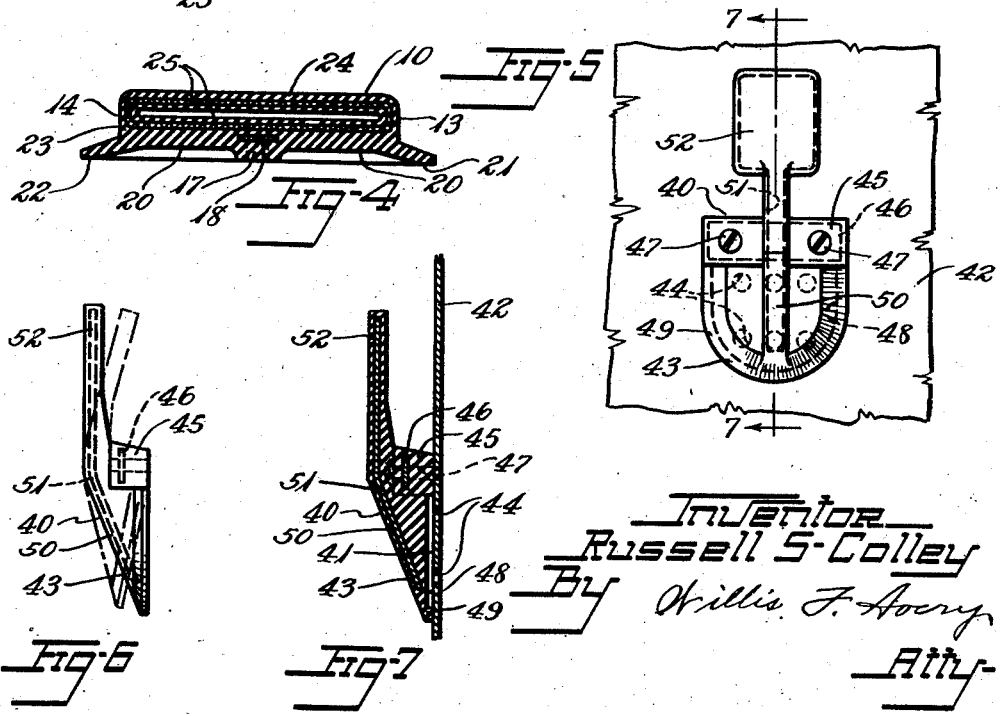
Inventor
Russell S. Colley
By Willis F. Avery
Atty.

Patented Dec. 23, 1947

2,433,092

UNITED STATES PATENT OFFICE 2,433,092

VALVE

Russell S. Colley, Kent, Ohio, assignor to The B. F. Goodrich Company, New York, N. Y., a corporation of New York Application March 6, 1944, Serial No. 525,157

13 Claims. (Cl. 251—15)

This invention relates to valves including flexible elements for flowable materials such, for example, as liquids and gases.

Objects of the invention are to provide for controlling in an improved manner the flow through an apertured structure, to provide flexible means for opening and closing an aperture in such structure, to provide for regulating such flow through an aperture at a curved seating face, to provide an improved valve for fluids, and to provide for simplicity of construction, convenience of manufacture, and effectiveness of operation.

A further object is to provide a valve that can be opened quickly by manual pressure and closed quickly upon release of such pressure.

These and other objects and advantages will be apparent from the following description.

In the drawings which form a part of this specification and in which like numerals are employed to designate like parts, Fig. 1 is a side view of a valve in the closed condition constructed in accordance with and embodying the invention, parts being broken away and in section, Fig. 2 is a view like Fig. 1 showing the valve in the open condition, Fig. 3 is an elevation of the valve shown in Fig. 1, Fig. 4 is a longitudinal section of the closing element before assembly of the latter with the valve, Fig. 5 is a view in elevation showing a modified construction, Fig. 6 is a side elevation of the valve of Fig. 5, broken lines showing the latter in the open condition, and Fig. 7 is a sectional view taken along line 7—7 of Fig. 5.

In the illustrative embodiment of the invention shown in Figs. 1 to 4, inclusive, a closing element 10 of flexible material such, for example, as resilient rubber or other rubber-like material is positioned at and adapted for sealing relation with a seating face 11 of a structure 12, which element 10 is in overlying relation at its end portions 13 and 14 with a plurality of spaced-apart apertures 15 and 16, the latter being in communication with the seating face 11 for permitting the flow of flowable material such, for example, as a liquid or a gas therethrough. The structure 12 may be integral with and in continuation of the wall of a cylindrical container, for example and since such wall may be substantially circular in cross-sectional contour, the seating face 11 which may be at the interior of such container, may also be of substantially circular or curved contour. The seating face 11 which may include stiff material such, for example, as a plastic material like Bakelite or a metal material like steel, has desirably a relatively smooth surface for sealing relation with the closing element 10.

The flexible closing element 10 may be generally rectangular in shape or may be any other suitable shape such as elliptical, circular and square. The element 10 includes the spaced-apart end portions 13 and 14 and an attaching portion 17 interconnecting such end portions. The attaching portion 17 may have embedded therein a reinforcing strip 18 of stiff material such, for example, as steel for facilitating the attachment of such element to the structure 12 as by screw fasteners 19 extending through spaced-apart apertures in such portion 17 and strip 18 and engaging the structure.

The end portions 13 and 14 have, preferably, concavities at 20 in their faces presented to the seating face 11 providing relatively narrow marginal portions 21 and 22 for sealing relation with the seating face, which marginal portions may be thinner in section and relatively more flexible than the remainder of the walls of such end portions for promoting the desired sealing action. The construction and arrangement of the end portions are such that the latter tend to flex in a hinging manner relative to the attaching portion 17 in the operation of the valve.

The closing element 10 also includes a bracing portion 23 overlying and extending across the end portions and the attaching portion for strengthening and coacting with the end portions, and includes additionally a strip portion 24 coextensive with and overlying the bracing portion. The strip portion 24 is substantially non-stretchable yet flexible and to this end it may have embedded therein relatively inextensible material 25 such, for example, as woven textile fabric, which material may be coextensive with such strip portion 24 and which may also be embedded in and extend along the upper part of the bracing portion 23 to provide the desired strength and flexibility, especially at the end regions of such portions 23 and 24. The strip portion 24 is in spaced-apart relation with the bracing portion intermediate its ends for accommodating an operating lever 26 for flexing the strip portion outwardly from the bracing portion thereby promoting flexure of the end portions 13 and 14 to open and close the apertures.

Since it is desirable that the closing element 10 be held at the curved seating face in a flexed condition for sealing purposes, such element may be molded and vulcanized in a substantially flat form as shown especially in Fig. 4; hence when it is positioned along the curved seating face, the element is flexed such that the marginal portions 21 and 22 of the end portions press resiliently against such seating face in sealing relation therewith. By virtue of such arrangement and the resiliency of the rubber-like material, such end portions 13 and 14 coacting with the bracing portion tend to resume their positions at the seating face when the closing element 10 is flexed to a further extent for opening the valve, as shown especially in Fig. 2, which action is also advantageous in resisting accidental opening of the valve. Other suitable molded forms such, for example, as convex or concave may be employed for the closing element for application to other contours of seating faces in order to obtain the desired initially flexed conditions of such element for the sealing action described hereinabove.

Suitable means such, for example, as the operating lever 26 is provided for flexing the closing element to open the valve. The lever 26 is pivotally mounted on a shaft 27 supported by a pedestal 28 attached to the structure 12 adjacent the seating face as by suitable screw fasteners 29. The lever 26 includes portions 30 and 31, the portion 31 having a projection 32 positioned beneath and in sliding engagement with the strip portion 24 of the closing element for flexing such strip portion.

In the operation of the valve, the portion 30 of the operating lever 26 is pressed towards the wall of the fluid container to the position shown in Fig. 2, which moves the other portion 31 in the opposite direction whereby the projection 32 presses against the strip portion 24 of the closing element 10 causing outward flexure of such portion 24 relative to the remainder of the closing element. This flexure of the relatively inextensible portion 24 induces further flexing of the bracing portion 23 and the end portions 13 and 14, the latter portions 13 and 14 flexing in a hinging manner at the attaching portion 17 such that the marginal portions 21 and 22 are not in continuous contact with the seating face 11 thus opening the apertures 15 and 16 and permitting the liquid or gas in the container to flow therethrough.

Moving the operating lever 26 in the opposite manner to the position shown in Fig. 1, permits the return of the end portions 13 and 14 into contact with the seating face 11 by virtue of the construction and arrangement of the closing element 10 and the resiliency of the rubber-like material thereof. The marginal portions 21 and 22 press resiliently against and are in sealing relation with the seating face thus closing the apertures 15 and 16 in the structure 12 in an effective manner. The simplicity of construction of the valve permits conveniently and effectively operating the same for regulating the flow of fluids and other flowable materials.

For the modified construction of the valve shown in Figs. 5, 6, and 7, a closing element 40 comprising suitable flexible material such as resilient rubber-like material is positioned at a seating face 41 of a structure 42, which element is in overlying relation at its end portion 43 with one or more apertures 44 in communication with the seating face 41 to provide for the flow of fluid therethrough. The structure 42 may be integral with and in continuation of the wall of a container for fluid, but the seating face 41 which may be at the interior wall of such container, is desirably relatively smooth and of substantially flat contour and may include suitable stiff material for sealing relation with the end portion 43.

In addition to the end portion 43, the closing element 40 comprises an attaching portion 45 which portion 45 may have embedded therein a reinforcing strip 46 of suitable stiff material such as steel for facilitating the attachment of the element 40 to the structure 42 as by suitable screw fasteners 47. The end portion 43 may have a depression or concavity at 48 in its face presented to the seating face 41 providing a relatively narrow marginal portion 49 which portion 49 may be relatively more flexible than the remainder of the end portion for promoting effective sealing action at the seating face.

For flexing the end portion 43 in a hinging manner at the attaching portion 45, a lever portion 50 including a reinforcing strip 51 of suitable stiff material may be provided and such lever portion is in overlying relation with the end portion and the attaching portion preferably at the longitudinal center-line of the closing element. The lever portion is constructed and arranged for pivotal movement at the attaching portion 45, a part at 52 of the lever 50 extending beyond the attaching portion and overlying in spaced relation the structure 42 for conveniently manipulating the closing element.

The closing element 40 is desirably molded and vulcanized as an integral unit and the arrangement is such that when the attaching portion is mounted at the seating face 41 that the marginal portion 49 of the end portion 43 is held pressed against the seating face in sealing relation therewith. The pressure of the fluid in the container may further assist in maintaining such sealing relation by its pressing action on the end portion.

To open the valve from the closed condition, the part at 52 of the lever portion 50 is moved in a pivotal manner about the attaching portion 45 to the open position indicated by broken lines in Fig. 6. Such movement causes the end portion 43 to flex in a hinging manner at the attaching portion 45 thereby moving the marginal portion 49 away from the seating face 41 and breaking the seal therewith, thus permitting the fluid to flow through the apertures 44. Returning the part at 52 of the lever portion 50 to the closing position permits the return of the end portion into contact with the seating face 41 by virtue of the resiliency of the rubber-like material and by virtue of the construction and arrangement of the closing element 40. The simplicity of construction of the modified valve promotes the convenience and effectiveness of operation of the same.

Variations may be made without departing from the scope of the invention as it is defined in the following claims.

I claim:

1. A valve comprising an apertured structure providing a curved seating face, a closing element mounted at said seating face and comprising a portion of resilient rubber-like material extending to a margin of said element and overlying the aperture in said structure at said seating face, means spaced from said margin for holding said portion at said seating face in a flexed condition and conforming to and pressing against said face, and means extending across the holding means to said margin for flexing said portion away from said seating face to open said valve, said element upon release of the flexing means being returnable to close the valve by virtue of the resilience of said material.

2. A valve comprising a structure having spaced-apart apertures and providing a seating face, a closing element mounted at said seating face comprising end portions including resilient rubber-like material overlying said apertures, and means comprising an element overlying and secured to said end portions for flexing said end portions away from said seating face to open said apertures, said end portions upon release of the flexing means being returnable to close the apertures by virtue of the resilience of said material.

3. A valve comprising an apertured structure providing a seating face, a closing element of resilient rubber-like material at said face and including a reinforced attaching portion attached to said structure and an end portion of said rubber-like material extending therefrom and overlying the aperture in said structure, said end portion having a concave face presented to said seating face providing a marginal portion of said material for sealing relation with said seating face, and a lever of stiff material extending across and pivotally mounted at said attaching portion and secured at an end thereof to said end portion, said rubber-like material being united with said lever and providing in the region of the attaching portion a hinging zone of said rubber-like material and a return-spring action for said end portion and said lever by virtue of the resilience of said rubber-like material.

4. A valve comprising a structure having spaced-apart apertures and providing a seating face, a closing element of resilient rubber-like material including end portions overlying said apertures and an attaching portion interconnecting said end portions and attached to said structure intermediate said apertures, said end portions having concave faces presented to said seating face providing marginal portions for sealing relation with said seating face, said closing element being constructed and arranged to press resiliently against said seating face along said marginal portions, a flexible strip element overlying said closing element and attached at the ends thereof to said end portions, and means for flexing said strip element away from said closing element relative to said seating face to flex said end portions for opening and closing said apertures.

5. A closing element for a valve having an apertured seating face, said element comprising a body of resilient rubber-like material comprising an attaching portion including a reinforcing strip of stiff material positionable at said seating face, an end portion for overlying the aperture and having a depression in its face presented to said seating face providing a marginal portion of said rubber-like material for sealing relation with the seating face, and a lever portion including a second reinforcing strip of stiff material transversely overlying said end portion and said attaching portion and extending beyond the latter said portion, said rubber-like material being united with said reinforcing strips and providing in the region of the first said strip a hinging zone of said rubber-like material and return-spring action for said lever by virtue of the resilience of said rubber-like material.

6. A closing element for a valve having spaced-apart apertures in a seating face, said element comprising a body of resilient rubber-like material positionable at said seating face in overlying relation with said apertures, said body comprising end portions having depressions in their faces presented to said seating face providing marginal portions for sealing relation with the seating face, an attaching portion including a reinforcing strip of stiff material interconnecting said end portions, a bracing portion overlying and extending across said end portions and said attaching portion, and a strip portion including relatively inextensible material coextensive with and overlying said bracing portion, said strip portion being in spaced-apart relation with said bracing portion intermediate the ends thereof for facilitating flexing said strip portion outwardly from said bracing portion to promote flexure of said end portions to open and close the apertures.

7. A valve comprising an apertured structure providing a seating face, a closing element of resilient rubber-like material overlying the aperture in said structure at said face, said element comprising an attaching portion secured to said structure and an end portion of said rubber-like material extending therefrom and adapted to be flexed about the region of said attaching portion by hinge action of said material, said end portion including a depending lip of said material extending from the end portion for sealing against said seating face and defining a concave face presented to the seating face, and means extending across and in overlying relation with said attaching portion and secured to said end portion for flexing said end portion away from said seating face about the region of said attaching portion for opening the valve, said end portion upon release of the flexing means being returnable to close the valve by virtue of the resiliency of said material.

8. A valve comprising an apertured structure providing a seating face, a closing element mounted at said face overlying the aperture in said structure, said element comprising a pad of resilient rubber-like material including a portion having a reinforcement therein spaced from a margin of said pad for attachment to said structure, means for attaching said portion to said structure while permitting flexing of said pad about the region of the reinforced portion by hinge action of said material, and manipulating means extending across said reinforced portion to said margin and united with said material at the margin for flexing said pad about the region of said reinforced portion to open the valve, said pad upon release of said manipulating means being returnable to close the valve by virtue of the resiliency of said material.

9. A valve comprising an apertured structure providing a seating face, a closing element of flexible material including an attaching portion secured to said structure and an end portion extending therefrom and overlying the aperture in said face, said end portion being of relatively greater flexibility than said attaching portion and adapted to be flexed about the region of said attaching portion by hinge action of said flexible material, and said end portion including a depending lip of flexible material of still greater flexibility as compared to the attaching and end portions for sealing against said seating face and defining a concave face presented to said seating face, and manipulating means extending across said attaching portion and united with said material at said end portion for flexing said end portion about the region of said attaching portion for opening and closing the valve.

10. A valve comprising an apertured structure providing a seating face, a closing element of resilient rubber-like material overlying the aperture in said structure at said face, said element comprising a reinforced attaching portion secured to said structure and an end portion of said rubber-like material extending therefrom and adapted to be flexed about the region of said attaching portion by hinge action of said material, said end portion including a depending marginal portion of said material relatively narrow in width as compared to the width of said end portion for sealing against said seating face and defining a concave face presented to said seating face at said aperture, and manipulating means extending across said attaching portion and united with said material at said end portion for opening the valve by flexure of said end portion about the region of said attaching portion, said end portion upon release of said manipulating means being returnable to close the valve by virtue of the resilience of said material.

11. A closing element for a valve having an apertured seating face, said element comprising a pad of resilient rubber-like material for overlying the aperture in said face, said pad including a reinforced portion spaced from a margin thereof for attachment to said face and a lever portion including a reinforcement therein overlying and extending across said reinforced portion for flexing the pad about the region of the latter portion, said rubber-like material being united with said reinforcement of the lever and providing in the region of said reinforced portion a hinging zone of said rubber-like material and providing a return-spring action for said pad by virtue of the resilience of said rubber-like material, and said pad including a depending lip of said rubber-like material for sealing relation with said seating face and defining a concave face positionable adjacent said seating face.

12. A closing element for a valve having an apertured seating face, said element comprising a pad of resilient rubber-like material for overlying the aperture in said face, said pad comprising an attaching portion for attachment to said face, an end portion of said rubber-like material extending therefrom for overlying said aperture and adapted to be flexed about the region of said attaching portion by hinge action of said material, said end portion including a depending lip extending from the end portion for sealing against said face and defining a concave face positionable adjacent said seating face, and a reinforced lever portion overlying and extending across said attaching portion and said end portion and united with said portions for flexing said end portion about the region of said attaching portion to open the valve, said end portion upon release of said lever portion being returnable to close the valve by virtue of the resilience of said rubber-like material.

13. A valve comprising a structure having spaced-apart apertures and providing a seating face, a closing element at said seating face comprising end portions including resilient rubber-like material overlying said apertures, and means for flexing said end portions for opening said apertures, said end portions upon release of the flexing means being returnable to close the apertures by virtue of the resilience of said material, and said means comprising a flexible strip element including relatively inextensible material overlying said closing element and attached at the ends thereof to said end portions, and means for flexing said strip element away from said closing element relative to said seating face.

RUSSELL S. COLLEY.

REFERENCES CITED

The following references are of record in the file of this patent:

UNITED STATES PATENTS

| Number | Name | Date |
|---|---|---|
| 571,065 | Clarke | Nov. 10, 1896 |
| 932,172 | Porter | Aug. 24, 1909 |
| 978,152 | Gutermuth | Dec. 13, 1910 |
| 1,138,994 | Steele | May 11, 1915 |
| 1,235,800 | Heller | Aug. 7, 1917 |
| 1,773,311 | Killen | Aug. 19, 1930 |
| 1,867,478 | Stelzner | July 12, 1932 |
| 1,957,585 | Gratian | May 8, 1934 |